US011852743B2

(12) United States Patent
Gagnon et al.

(10) Patent No.: US 11,852,743 B2
(45) Date of Patent: Dec. 26, 2023

(54) ENVIRONMENT-LEARNING FALSE RADAR DETECTION

(71) Applicant: HEWLETT PACKARD ENTERPRISE DEVELOPMENT LP, Houston, TX (US)

(72) Inventors: Jean-Francois Gagnon, St. Laurent (CA); Myung Cheol Kim, Santa Clara, CA (US); Andre Beaudin, St. Laurent (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 343 days.

(21) Appl. No.: 17/167,617

(22) Filed: Feb. 4, 2021

(65) Prior Publication Data
US 2022/0244345 A1    Aug. 4, 2022

(51) Int. Cl.
  *G01S 7/02*    (2006.01)
  *G01S 7/292*   (2006.01)
  *H04W 72/50*   (2023.01)
  *H04W 74/08*   (2009.01)

(52) U.S. Cl.
  CPC .............. *G01S 7/021* (2013.01); *G01S 7/023* (2013.01); *G01S 7/292* (2013.01); *H04W 72/535* (2023.01); *H04W 74/0816* (2013.01)

(58) Field of Classification Search
  CPC .......... G01S 7/021; G01S 7/023; G01S 7/292; H04W 72/535; H04W 74/0816
  See application file for complete search history.

(56) References Cited

U.S. PATENT DOCUMENTS

| | | | | |
|---|---|---|---|---|
| 11,283,475 B1* | 3/2022 | Tsai | ...................... | H04W 28/20 |
| 2004/0047324 A1* | 3/2004 | Diener | .................. | H04L 1/1664 |
| | | | | 370/319 |
| 2007/0077892 A1* | 4/2007 | Muquet | .................. | H04K 3/822 |
| | | | | 455/67.11 |
| 2014/0254346 A1* | 9/2014 | Rezk | ....................... | G01S 7/021 |
| | | | | 370/210 |
| 2022/0225131 A1* | 7/2022 | Desai | .................... | H04W 24/06 |

* cited by examiner

*Primary Examiner* — Donald H B Braswell
(74) *Attorney, Agent, or Firm* — Sheppard Mullin Richter & Hampton LLP

(57) ABSTRACT

Systems and methods are provided for learning radio frequency pulses transmitted at various frequencies in a wireless environment, including false radar signals and actual radar. For example, the system can keep a list of radio frequency pulse characteristics detected by access points (APs) but ignored when not declared a radar. The detected radio frequency pulse can be compared with those on the list and may be added to the deny-list if not radar. The AP learns what intervals are normal for the communication environment and if the noise someday looks like a real radar (but it not actually a radar), it will not be classified as radar because it is on the deny-list.

22 Claims, 10 Drawing Sheets

Deny List Pulse Data Store 600

| Before | | After | |
|---|---|---|---|
| Pulse Characteristic | Counter | Pulse Characteristic | Counter |
| 340 | 1 | 340 | 3 |
| 900 | 1 | 900 | 1 |
| 3000 | 7 | 3000 | 7 |
| 2000 | 3 | 2000 | 3 |
| 2300 | 4 | 2300 | 4 |

Update Row 610

Deny List Pulse Data Store 700

| Before | | After | |
|---|---|---|---|
| Pulse Characteristic | Counter | Pulse Characteristic | Counter |
| 340 | 1 | 340 | 1 |
| 900 | 1 | 310 | 4 |
| 3000 | 7 | 3000 | 7 |
| 2000 | 3 | 2000 | 3 |
| 2300 | 4 | 2300 | 4 |

Replace Row 710

Deny List Pulse Data Store 800

| Before | | After | | |
|---|---|---|---|---|
| Pulse Characteristic | Counter | Pulse Characteristic | Counter | |
| 340 | 1 | - | - | ⎫ Prune Rows 810 |
| 900 | 1 | - | - | ⎭ |
| 3000 | 7 | 3000 | 6 | ⎫ |
| 2000 | 3 | 2000 | 2 | ⎬ Decay Counters 820 |
| 2300 | 4 | 2300 | 3 | ⎭ |

FIG. 8

ENVIRONMENT-LEARNING FALSE RADAR DETECTION

DESCRIPTION OF RELATED ART

Wireless devices detect radar in a shared frequency. To distinguish between radar and noise, these wireless devices employ interference mitigation techniques to detect radar and share the frequency bands. In general, these wireless devices can detect a radio frequency pulse, identify that the radio frequency pulse is radar when multiple pulses are detected, and avoid using the frequency band currently in use by the radar. However, with these frequency bands increasing being relied on for transmitting and receiving radio frequency pulses and other wireless transmissions, better solutions are needed to identify that the radio frequency pulse is radar or not.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 6 illustrates a deny list pulse data store, in accordance with embodiments of the application.

FIG. 7 illustrates a deny list pulse data store, in accordance with embodiments of the application.

FIG. 8 illustrates a deny list pulse data store, in accordance with embodiments of the application.

Figure 1:
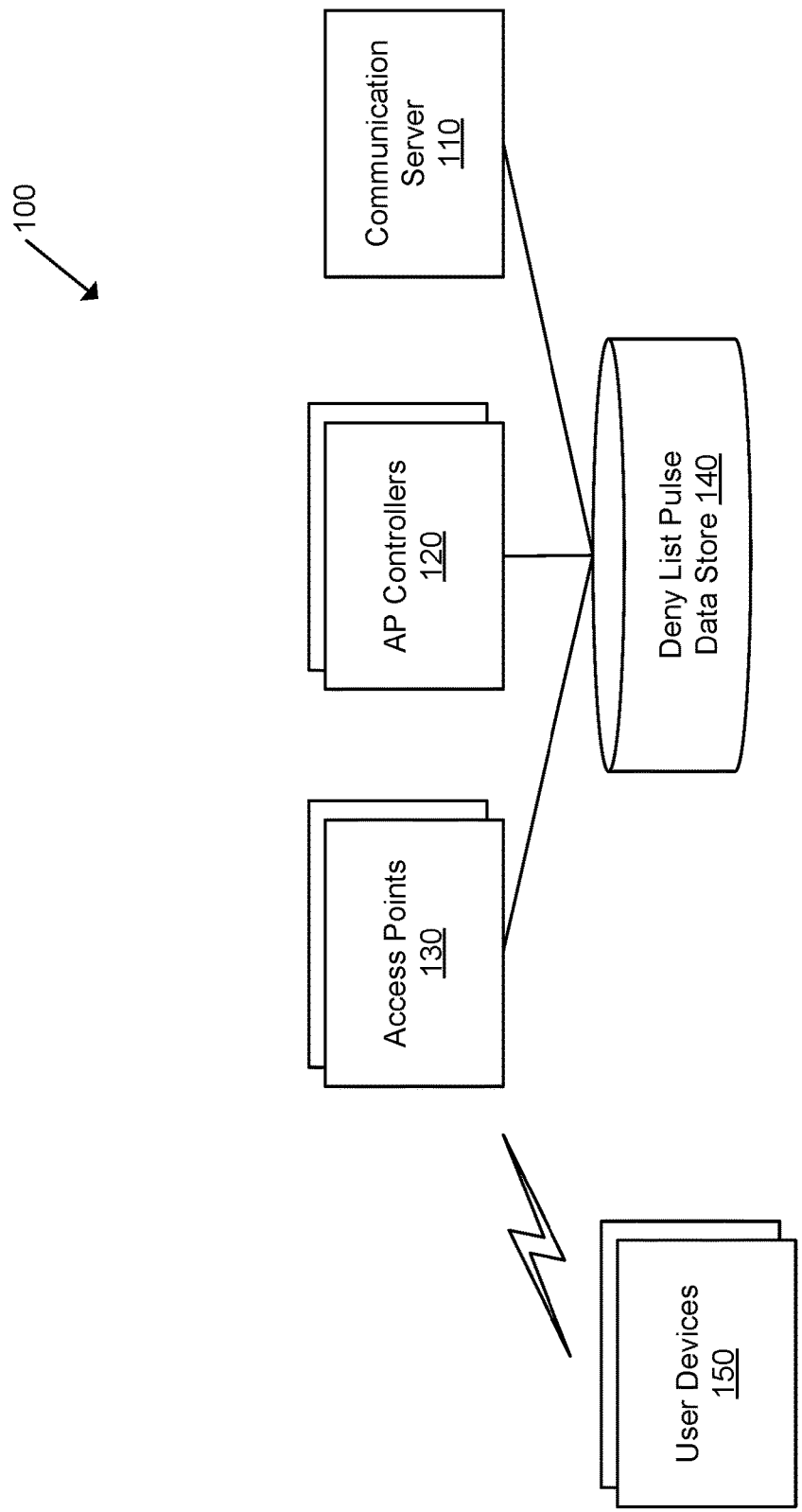
FIG. 1 illustrates an example of an environment of wireless devices, in accordance with embodiments of the application.

The figures are not exhaustive and do not limit the present disclosure to the precise form disclosed.

DETAILED DESCRIPTION

Wireless devices (e.g., any radio-frequency emitting device) can detect radar in multiple frequencies, and to comply with use of these frequencies (e.g., by the Federal Communication Commission, etc.) some of these channels require the use of a Dynamic Frequency Selection (DFS). DFS is a spectrum sharing mechanism that defines rules dictating use of the frequency. One particular rule in using DFS requires an access point (AP) to detect radar signals (e.g., by matching a predefined, stored interval and width pattern). When multiple radio frequency pulses are detected and recognized a radar signal, DFS requires that the AP leave the channel and not return for some predetermined amount of time (e.g., 30 minutes, etc.).

When these radio frequency pulses do not aggregate to radar, they may be noise in the particular frequency. For example, these radio frequency pulses may vary in pulse repetition interval, pulse width, signal power, frequency offset, or chirp (e.g., various pulse characteristics of a radio frequency pulse) that are different than an actual radar. With devices detecting these radio frequency pulses as a constant noise (e.g., happening every "x" seconds), a false radar detection issue can be triggered and may utilize computing resources in the wireless device that are better used elsewhere.

As an illustrative example, a particular radio frequency pulse may have several pulse characteristics of radar but not match the threshold of predefined pulse characteristics required to be radar. As such, the particular radio frequency pulse may be noise. In traditional systems, the particular radio frequency pulse may keep being detected by wireless devices at the particular frequency and without matching the radar criteria, which can divert processing capabilities from other functions.

Embodiments described herein can learn the radio frequency pulses transmitted at various frequencies in a wireless environment, including false radar signals and actual radar. For example, false radar or noise may correspond with pulse characteristics that are different than radar, including power difference, frequency changing, different chirp, etc. These pulse characteristics can cause the radio frequency pulse to be rejected for not fitting the specification of radar (or may be detected as not a radar by other means). Embodiments described herein improve these methods by enabling, for example, the APs to keep a list of interval characteristics detected by the APs but ignored when not declared a radar. The radio frequency pulse can be compared with those on the list and may be added to the deny-list if not radar. The AP learns what intervals are normal for the wireless environment and if the noise someday looks like a real radar (but it not actually a radar), it will not be classified as radar because it is on the deny-list. In other examples, radar may be added to another type of data table that can include a set of particular radar characteristics that would identify the incoming radio frequency pulse as radar, without diverting from the scope of the disclosure.

In an illustrative example, the system may add a radio frequency pulse to a deny-list where the radio frequency pulse originates from a specific user device. The use of a deny-list may only slightly reduce a probability of detecting real radar because only a fraction of the range may be added to the deny-list.

Technical advantages are realized throughout the application. For example, radio frequency pulses that are not radar can be removed from further analysis and placed on a deny-list. When the radio frequency pulse is detected in the future, the wireless device can ignore the radio frequency pulse as noise without analyzing it as potential radar detection. This may prevent unneeded processing by the wireless device and improve computational efficiency for the communication network.

The use of a deny-list also differs from traditional systems in several ways. For example, a traditional system may not implement a deny-list, but rather may only implement a frequency and/or time domain analysis on all received radio frequency pulses in a frequency band. Particular intervals within a pulse train are analyzed and calculated period information may be used to identify the radar. This traditional system would not use a deny-list to help detect intervals by APs and determine if they are radar. Rather, a repeated radio frequency pulse may be analyzed each time it is detected without first checking the ongoing deny-list, which can waste computational resources with unnecessary and repeated analysis by the system.

FIG. 1 illustrates an example of a wireless communication network, in accordance with embodiments of the application. A plurality of radio frequency pulses may be transmitted across multiple frequency bands in an environment 100 of wireless devices, including communication server 110 (e.g., backend cloud system, etc.), access point (AP) controllers 120, APs 130, deny list pulse data store 140, and user devices 150. More or fewer of each device illustrated in environment 100 may be implemented without diverting from the essence of the disclosure. In some examples, environment 100 illustrates one example of a network configuration that may be implemented for an organization, such as a business, educational institution, governmental entity, healthcare facility, or other organization. This diagram illustrates an example of a configuration implemented with an organization having multiple users (or at least user devices 150).

Figure 2:
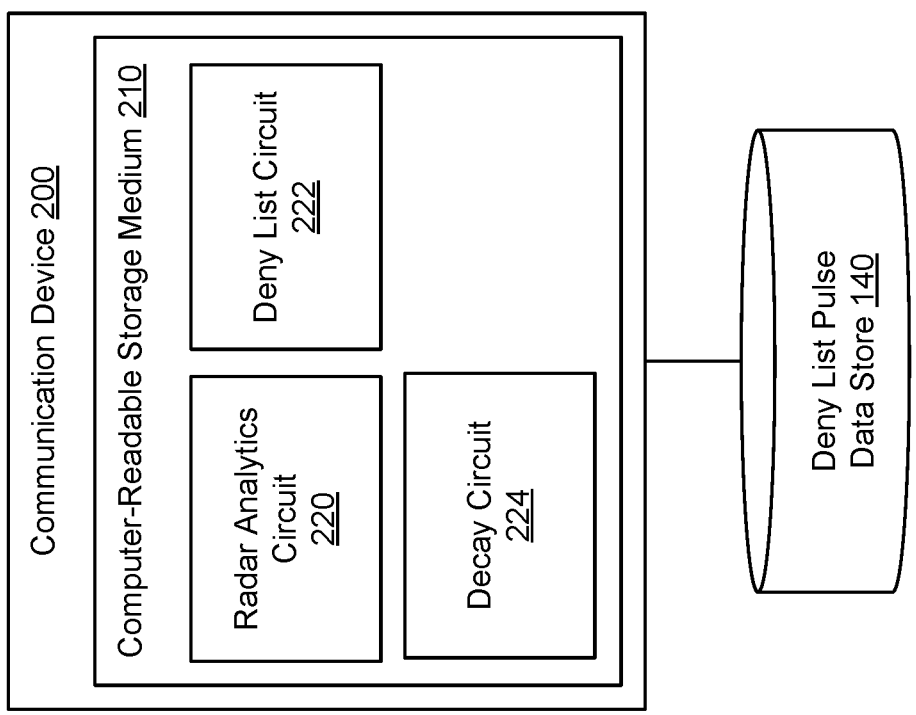
FIG. 2 illustrates components of a specialized communication device and deny list pulse data store, in accordance with embodiments of the application.

Communication server 110, AP controllers 120, and/or APs 130 may correspond with components of a specialized communication device, as illustrated in FIG. 2. For example, communication device 200 may comprise a memory, one or more processors, and computer readable storage medium 210. Computer readable storage medium 210 may comprise one or more specialized circuits, including radar analytics circuit 220, deny list circuit 222, and decay circuit 224.

Radar analytics circuit 220 may be configured to detect a radar signal through a receiver. Upon detecting an event, the receiver analyzes the incoming radio frequency pulse. Various types of unrecognized events can be detected by the receiver, including noise or co-channel interference.

Radar analytics circuit 220 may be configured to detect one or more characteristics of the radio frequency pulse that are transmitted in the 5 GHz space, or other radio bands as available. Each radio frequency pulse may comprise a high-frequency (approximately 2.4, 5, or 6 GHz) sine wave with a pulse duration of approximately one microsecond to 100 microseconds. The pulse period is the time between the start of consecutive pulses and is the inverse of the Pulse Repetition Frequency (PRF). The pulse period is typically on the order of 150 microsecond to 5000 microsecond. The pulse count refers to the number of pulses in a burst or the time duration associated with the burst of pulses. The burst interval is the time from the start of one burst to the start of the next consecutive burst, and is on the order of one second to ten seconds.

Radar analytics circuit 220 may be configured to determine whether the incoming signal is a radar or not. For example, when the radio frequency pulse matches a predetermined radar pattern (e.g., by matching an interval and width pattern, etc.), the radio frequency pulse may be a radar. Otherwise, the radio frequency pulse may be analyzed to determine whether to add it to the deny-list.

Radar may be determined using various methods, including based on an analysis of pulse characteristics of the detected radio frequency pulse. For example, the pulse width or pulse duration/length of the detected radio frequency pulse may be within 0.1 microseconds of a predetermined time. If true, the detected radio frequency pulse may be radar.

Deny list circuit 222 may be configured to gather the radio frequency pulses (e.g., determined by radar analytics circuit 220 and not radar) and determine a pulse count associated with each radio frequency pulse within a time period. Each detected radio frequency pulse may be used to increment the pulse counter of the radio frequency pulse detected in the environment of wireless devices.

Deny list circuit 222 may be configured to add one or more pulse characteristics to a corresponding deny-list. For example, a first deny-list may correspond with a first pulse characteristic and a second deny-list may correspond with a second pulse characteristic, each of which are stored in a digital ledger or deny list pulse data store 140 (used interchangeably). As an illustrative example, the first deny-list may correspond with a pulse repetition interval and the second deny-list may correspond with a pulse width. In some examples, a combined deny-list may correspond with a plurality of pulse characteristics (e.g., both pulse repetition interval and pulse width) in a digital ledger or deny list pulse data store 140 (used interchangeably). Deny list circuit 222 may be configured to review the deny-list of radio frequency pulses to determine which of the radio frequency pulses are most frequently transmitted in environment 100 (e.g., based on the pulse counter).

Decay circuit 224 may be configured to decrement the pulse counter of one or more radio frequency pulses stored in deny list pulse data store 140 in accordance with a predetermined time interval. For example, each pulse counter corresponding with each of the radio frequency pulse definitions that are stored in deny list pulse data store 140 may be decremented (e.g., by one each week, by two each month, etc.). In another example, each pulse counter may be decremented by a predetermined value when it reaches a threshold value (e.g., when a pulse counter less than or equal to seven the pulse counter is reduced to zero and/or radio frequency pulse is removed from the deny-list).

Returning to FIG. 1, communication server 110, AP controllers 120, and APs 130 may alternatively correspond with components of a generalized communication device as understood by a person of reasonable skill in the art.

Communication server 110 may be configured to receive a deny-list from AP controllers 120 and transmit the list to a different environment of electronic devices that is in communication with communication server 110. For example, when a user device is purchased from a same source and shipped to two different environments (e.g., California and New York, a first building to a second building in a same city, etc.), the radio frequency pulse for that device may be unchanged in the different environments. The communication server 110 may determine a common radio frequency pulse (that is not radar) for a first environment of wireless devices (that is added to a first deny-list) and transmit pulse characteristics for that radio frequency pulse to a second environment of wireless devices. The radio frequency pulse may be added to the deny-list of the second environment of wireless devices, for example, prior to any APs in the second environment of wireless devices detecting the radio frequency pulse in the second environment.

AP controllers 120 may enable transmission of wireless communication with other devices on environment 100, though it may not be the only point of communication. A single AP controller 120 is illustrated, though wireless communication network 100 may include multiple controllers and/or multiple communication points with environment 100. In some embodiments, AP controller 120 communicates with other devices in environment 100 through a router (not illustrated). In other embodiments, AP controller 120 provides router functionality to the other devices.

AP controller 120 may be operable to configure and manage network devices. AP controller 120 may be operable to configure and/or manage switches, routers, APs, and/or client or user devices connected to environment 100. AP controller 120 may itself be, or provide the functionality of, an access point.

AP controller 120 may be in communication with one or more APs 130. For example, APs 130 generally refer to a networking device that allows user devices 150 or station (STA) to connect to a wired or wireless network, in this case, environment 100. Each AP 130 can include a processor, memory, and I/O interfaces, including wired network interfaces such as IEEE 802.3 Ethernet interfaces, as well as wireless network interfaces such as IEEE 802.11 Wi-Fi interfaces, although examples of the disclosure are not limited to such interfaces. Each AP 130 can include memory, including read-write memory, and a hierarchy of persistent memory such as ROM, EPROM, and Flash memory. Moreover, as used herein, AP 130 may refer to receiving points for any known or convenient wireless access technology which may later become known. Specifically, the term AP is not intended to be limited to IEEE 802.11-based APs.

Using a connection to AP 130, user devices 150 may access network resources, including other devices on environment 100. As used herein, user device 150 refers to a device including a processor, memory, and I/O interfaces for wired and/or wireless communication. Examples of user devices 150 may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

User devices 150 may be configured to transmit one or more radio frequency pulses or radar in environment 100 that are detected by AP 130. Each user device 150 may transmit a radio frequency pulse in the 2.4, 5, or 6 GHz space, or other radio bands as available.

Deny list pulse data store 140 may store a plurality of radio frequency pulses. The radio frequency pulses may be detected by APs 130 and stored with deny list pulse data store 140, which may be accessible, searchable, and updatable by communication server 110, AP controllers 120, or APs 130. Additional detail corresponding with storing and updating deny list pulse data store 140 is provided with FIGS. 6-8.

In some examples, deny list pulse data store 140 may comprise a limited or finite storage capacity for storing radio frequency pulses in a deny-list. The size of deny list pulse data store 140 may be limited for technical simplicity (e.g., to improve system performance). In some examples, the size of deny list pulse data store 140 may be limited to prevent every radio frequency pulse from being added to the deny-list in deny list pulse data store 140, which may decrease the ability of APs in the system from detecting more radar rather than identifying potential radar as noise (e.g., by not identifying enough intervals of the radio frequency pulse that could be radar, etc.). In this way, only the most active radio frequency pulses that are not radar may be added to the deny-list (e.g., top 4 or top 50).

Figure 3:
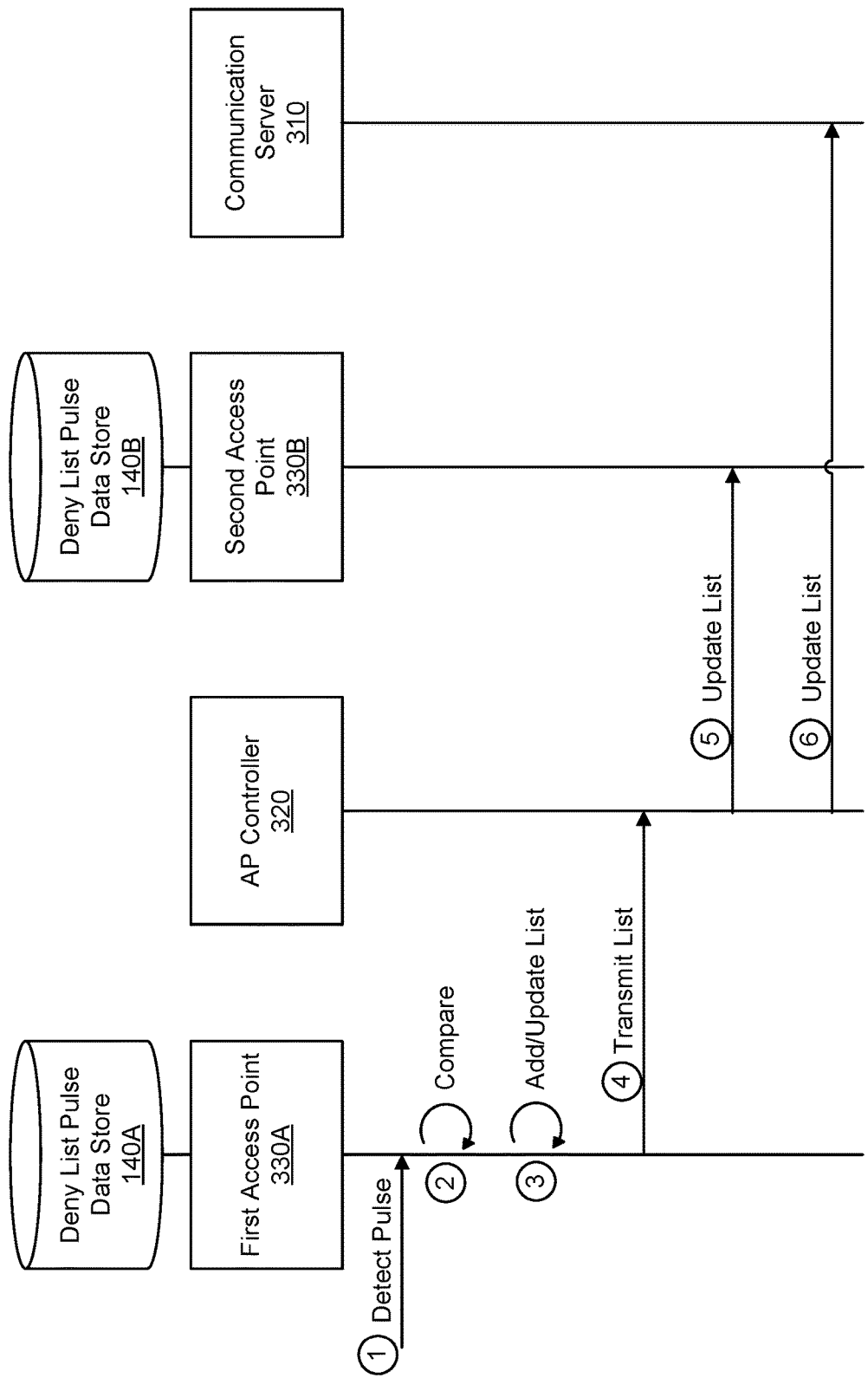
FIG. 3 provides a communication process for implementing environment-learning false radar detection, in accordance with embodiments of the application.

FIG. 3 provides a communication process for implementing environment-learning false radar detection, in accordance with embodiments of the application. The illustrated process of detecting radar may help update and maintain a deny-list at the APs for the environment of wireless devices. Deny list pulse data store 140 may be stored and maintained by first access point 330A.

At block 1, first access point 330A may detect a radio frequency pulse in the environment of wireless devices.

At block 2, first access point 330A may compare one or more pulse characteristics of the detected radio frequency pulse with pulse characteristics of radio frequency pulses that are currently stored in the deny list pulse data store 140A.

At block 3, first access point 330A may add the detected radio frequency pulse to the deny list pulse data store 140A. When the detected radio frequency pulse is currently stored in the deny list, the pulse counter may be incremented to identify an additional detection of a previously detected radio frequency pulse.

At block 4, first access point 330A may transmit the deny list to AP controller 320.

At block 5, AP controller 320 may transmit the deny list to other wireless devices, including second access point 330B. Second access point 330B may update a local deny list pulse data store 140B with any new radio frequency pulses included in the deny-list.

At block 6, AP controller 320 may transmit the deny list to communication server 310. In some examples, communication server 310 may further distribute the deny list to other environments comprising different wireless devices.

Figure 4:
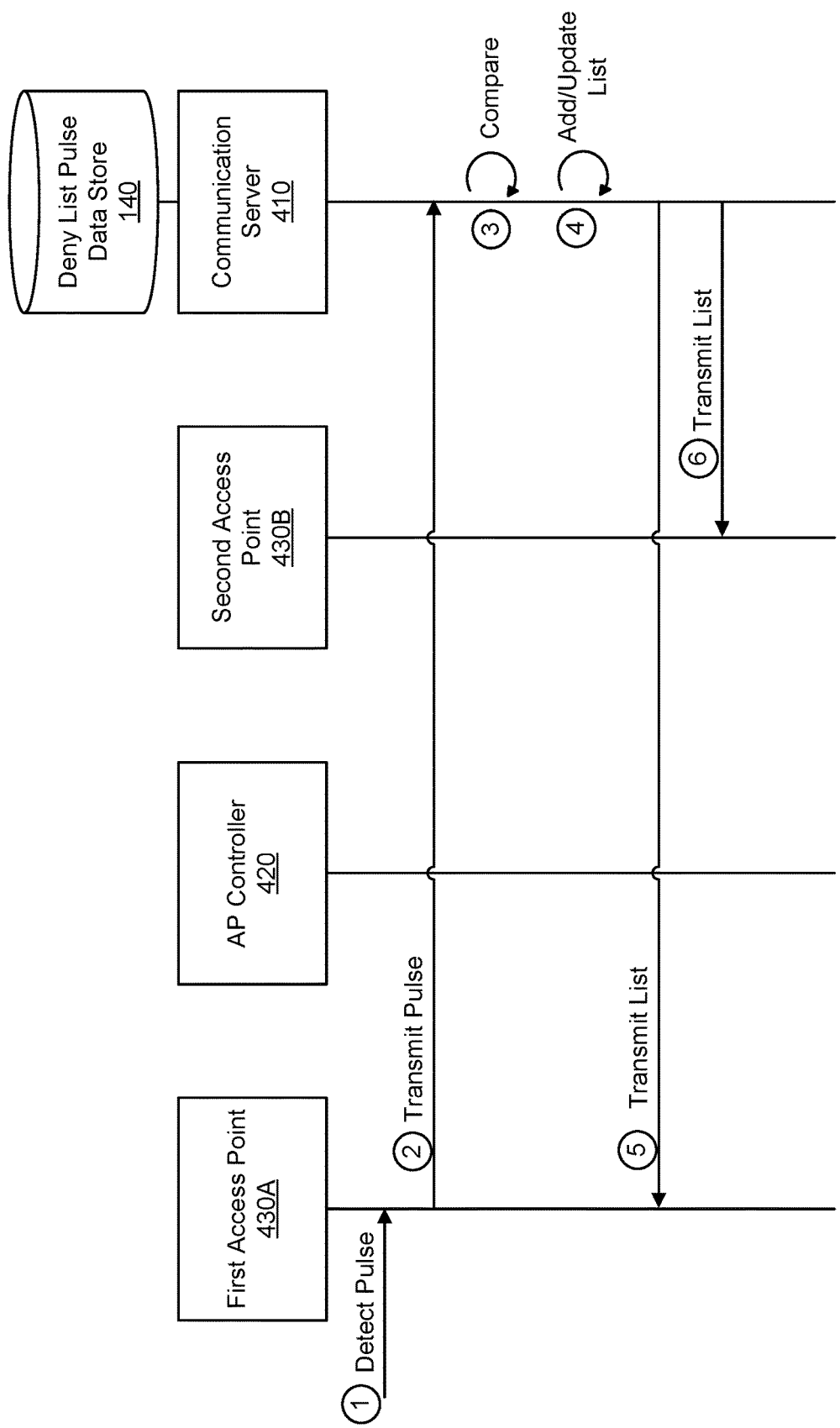
FIG. 4 provides a communication process for implementing environment-learning false radar detection, in accordance with embodiments of the application.

FIG. 4 provides a communication process for implementing environment-learning false radar detection, in accordance with embodiments of the application. The illustrated process of detecting radar may help update and maintain a deny-list at communication server 410 for the environment of wireless devices. Deny list pulse data store 140 may be stored and maintained by communication server 410.

At block 1, first access point 430A may detect a radio frequency pulse in the environment of wireless devices.

At block 2, first access point 430A may transmit the radio frequency pulse and/or corresponding pulse characteristics to communication server 410.

At block 3, communication server 410 may compare one or more pulse characteristics of the detected radio frequency pulse with radio frequency pulses that are currently stored in the deny list pulse data store 140.

At block 4, communication server 410 may add the detected radio frequency pulse to the deny list pulse data store 140. When the detected radio frequency pulse is currently stored in the deny list, the pulse counter may be incremented to identify an additional detection of a previously detected radio frequency pulse.

At block 5, communication server 410 may transmit the deny list to first access point 430A that detected the radio frequency pulse.

At block 6, communication server 410 may transmit the deny list to other wireless devices, including second access point 430B. In some examples, communication server 410 may transmit the deny list to AP controller 420, and AP controller 420 may transmit the deny list to other wireless devices, including second access point 430B.

Figure 5:
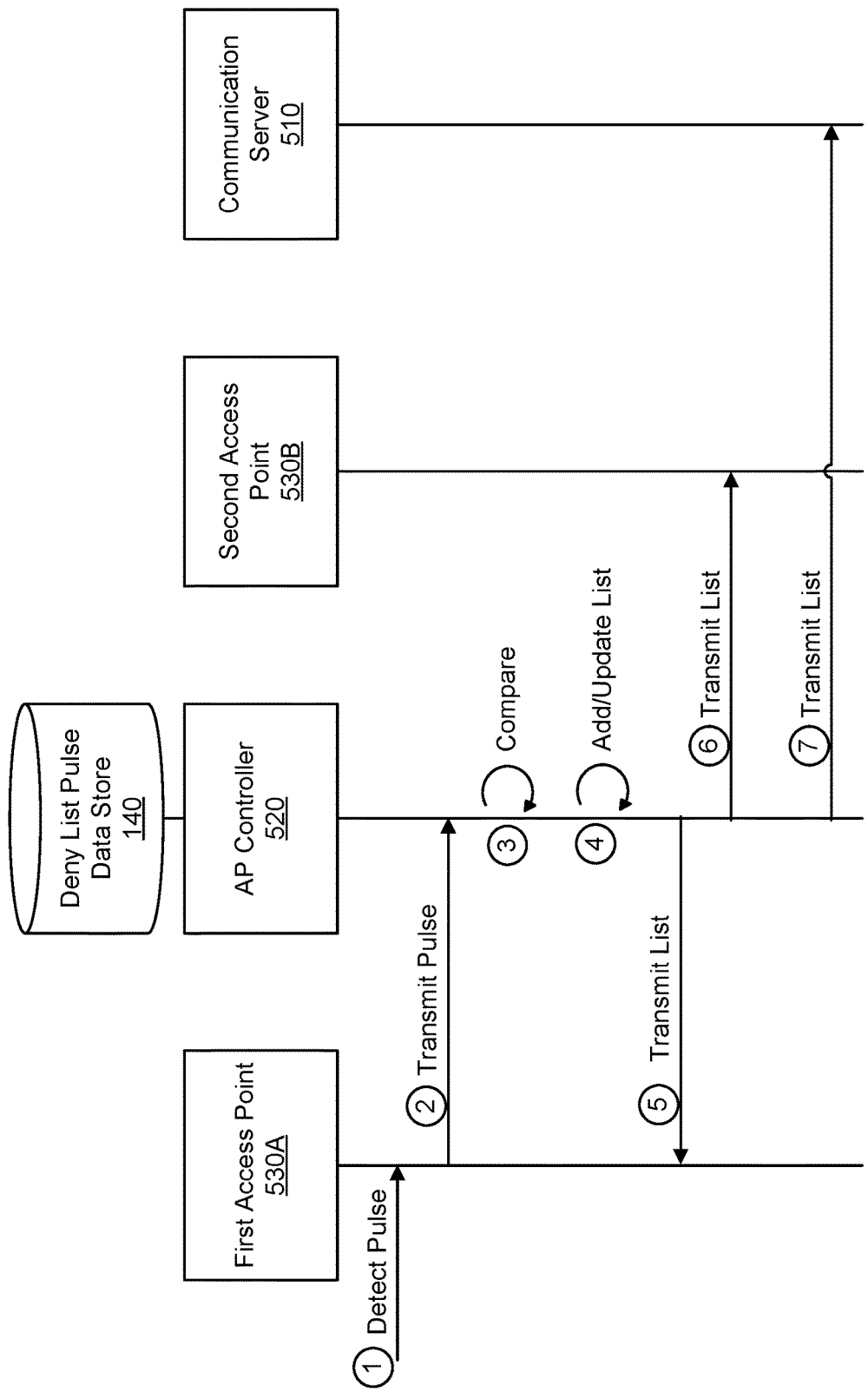
FIG. 5 provides a communication process for implementing environment-learning false radar detection, in accordance with embodiments of the application.

FIG. 5 provides a communication process for implementing environment-learning false radar detection, in accordance with embodiments of the application. The illustrated process of detecting radar may help update and maintain a deny-list at AP controller 520 for the environment of wireless devices. Radio frequency pulse data store 140 may be stored and maintained by AP controller 520.

At block 1, first access point 530A may detect a radio frequency pulse in the wireless communication environment.

At block 2, first access point 530A may transmit the radio frequency pulse and/or corresponding pulse characteristics to AP controller 520.

At block 3, AP controller 520 may compare one or more pulse characteristics of the detected radio frequency pulse with radio frequency pulses that are currently stored in the deny list pulse data store 140.

At block 4, AP controller 520 may add the detected radio frequency pulse to the deny list pulse data store 140. When the detected radio frequency pulse is currently stored in the deny list, the pulse counter may be incremented to identify an additional detection of a previously detected radio frequency pulse.

At block 5, AP controller 520 may transmit the deny list to first access point 530A that detected the radio frequency pulse.

At block 6, AP controller 520 may transmit the deny list to other wireless devices, including second access point 530B.

At block 7, AP controller 520 may transmit the deny list to communication server 510.

FIG. 6 illustrates a deny list pulse data store, in accordance with embodiments of the application. Deny list pulse data store 600 may be limited to a deny-list of radio frequency pulses and/or may correspond with deny list pulse data store 140 illustrated in FIG. 1. For example, in deny list pulse data store 600, a plurality of radio frequency pulses may be stored with a pulse counter identifying the number of times the radio frequency pulse has been detected in the environment of wireless devices. Radio frequency pulses stored in deny list pulse data store 600 may be detected by devices described throughout the application.

As shown, existing radio frequency pulse 340 may be detected one time in the environment of wireless devices. Upon receiving an additional pulse in the same environment whose characteristics match existing radio frequency pulse 340, the pulse counter is incremented from one to three at row 610. For example, the pulse counter may be incremented more than one value at a time to correspond with a number of times the pulse characteristic is detected in in the radio band. The larger value of the pulse counter in the deny list may correspond with the greater number of times the pulse characteristic is detected in the pulse frequency. As another illustrative example, the original counter value may be 4 pulses and a second detection may correspond with 6 pulses of the same pulse characteristic. The counter may be replaced from 4 to 6. Other pulse counters may remain unchanged.

FIG. 7 illustrates a deny list pulse data store, in accordance with embodiments of the application. Deny list pulse data store 700 may be limited to a deny-list of radio frequency pulses and/or may correspond with deny list pulse data store 140 illustrated in FIG. 1. For example, in deny list pulse data store 700, a plurality of radio frequency pulses may be stored with a pulse counter identifying the number of times the radio frequency pulse has been detected in the environment of wireless devices. Radio frequency pulses stored in deny list pulse data store 700 may be detected by devices described throughout the application.

As shown, new radio frequency pulse 310 may be detected four times in the environment of wireless devices. The wireless device that is maintaining deny list pulse data store may compare new radio frequency pulse 310 with existing radio frequency pulses in deny list pulse data store 700 to determine if new radio frequency pulse 310 currently exists in deny list pulse data store 700. The wireless device may determine that new interval pulse 310 does not exist in deny list pulse data store 700 and the pulse counter corresponding with new radio frequency pulse 310 exceeds the pulse counter of at least one existing pulse in deny list pulse data store 700. The wireless device may use new radio frequency pulse 310 to replace an existing radio frequency pulse whose pulse counter is less than new radio frequency pulse 310. In this illustration, new radio frequency pulse 310, which is detected four times, may replace existing pulse 900, which was previously detected only once, or potentially detected more than once at decreased based on the decay function. Pulse 900 may be removed from deny list pulse data store 700 to make room for new radio frequency pulse 310 at row 710, at least in part to show that the row is replaced from an existing pulse characteristic to a new pulse characteristic. Other pulse counters may remain unchanged.

FIG. 8 illustrates a deny list pulse data store, in accordance with embodiments of the application. Deny list pulse data store 800 may be limited to a deny-list of radio frequency pulses and/or may correspond with deny list pulse data store 140 illustrated in FIG. 1. For example, in deny list pulse data store 800, a plurality of radio frequency pulses may be stored with a pulse counter identifying the number of times the radio frequency pulse has been detected in the environment of wireless devices. Radio frequency pulses stored in deny list pulse data store 800 may be detected by devices described throughout the application.

As shown, existing radio frequency pulses may be detected in an environment of wireless devices. One or more pulse characteristics and a corresponding pulse counter may be stored in deny list pulse data store 800. At a predetermined time interval, the pulse counter for each of the radio frequency pulses may be decremented in accordance with a decay function (e.g., by 1 each week, by 2 each month, etc.). As illustrated, each of the counters at each row is decremented, as shown in column 820. The pulses with a zero pulse counter may be pruned or removed from deny list pulse data store 800, as shown with rows 810, to make room for new radio frequency pulses detected in the environment.

Figure 9:
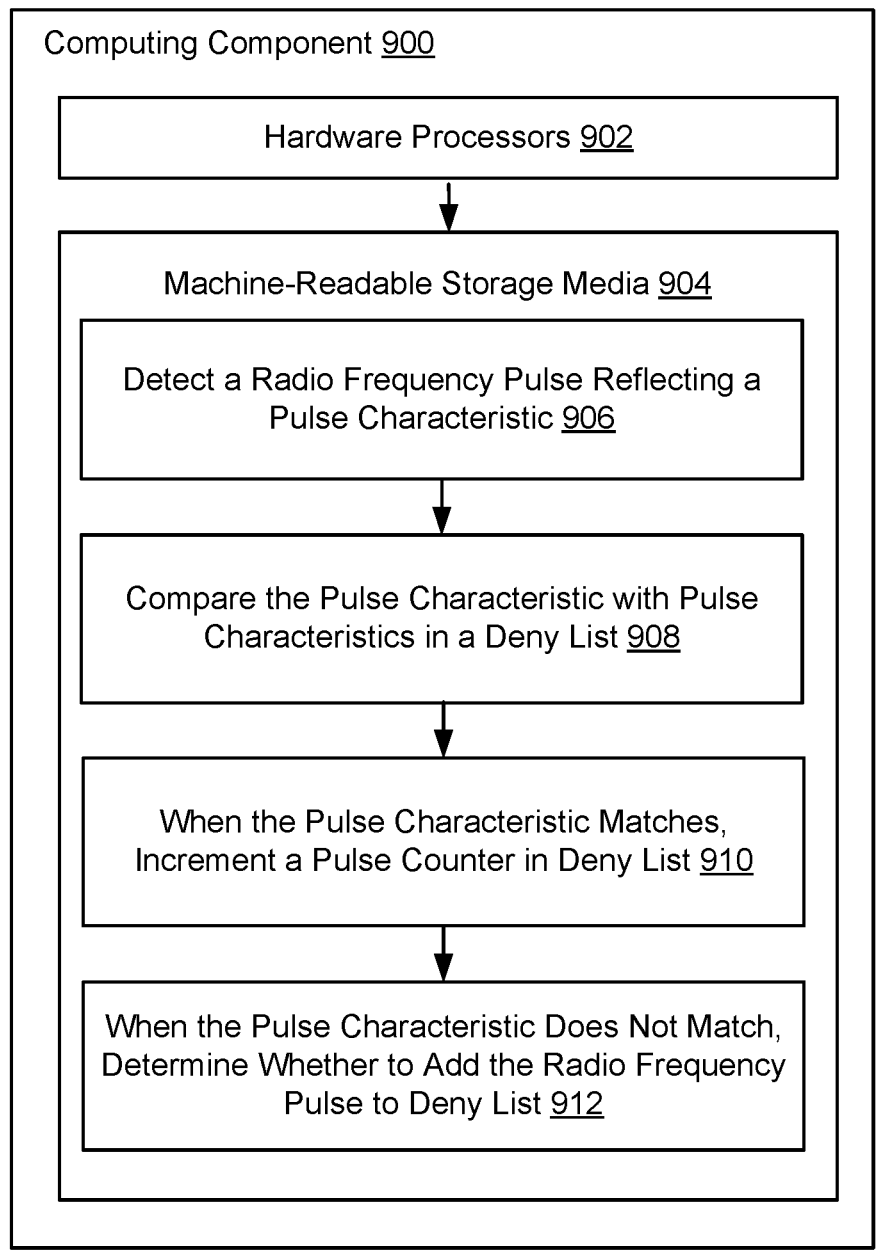
FIG. 9 illustrates a computing component for implementing environment-learning false radar detection, in accordance with embodiments of the application.

FIG. 9 illustrates an example iterative process performed by a computing component 900 for implementing environment-learning false radar detection. Computing component 900 may be, for example, a server computer, a controller, or any other similar computing component capable of processing data. In the example implementation of FIG. 9, the computing component 900 includes a hardware processor 902, and machine-readable storage medium 904. In some embodiments, computing component 900 may be an embodiment of a system corresponding with communication server 110, AP controller 120, or access point 130 of FIG. 1.

Hardware processor 902 may be one or more central processing units (CPUs), semiconductor-based microprocessors, and/or other hardware devices suitable for retrieval and execution of instructions stored in machine-readable storage medium 904. Hardware processor 902 may fetch, decode, and execute instructions, such as instructions 906-912, to control processes or operations for optimizing the system during run-time. As an alternative or in addition to retrieving and executing instructions, hardware processor 902 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 904, may be any electronic, magnetic, optical, or other physical storage device that contains or stores executable instructions. Thus, machine-readable storage medium 904 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 904 may be a non-transitory storage medium, where the term "non-transitory" does not encompass transitory propagating signals. As described in detail below, machine-readable storage medium 904 may be encoded with executable instructions, for example, instructions 906-912.

Hardware processor 902 may execute instruction 906 to detect a radio frequency pulse. For example, hardware processor 902 may detect a radio frequency pulse reflecting a pulse characteristic. The detected radio frequency pulse may reflect the pulse characteristic that is stored in a deny list (e.g., at hardware processor 902).

Hardware processor 902 may execute instruction 908 to compare the pulse characteristic with pulse characteristics corresponding to a plurality of detected radio frequency pulses.

Hardware processor 902 may execute instruction 910 to increment a pulse counter. For example, when the pulse characteristic matches at least one of the pulse characteristics of the pulse characteristics corresponding to the plurality of detected radio frequency pulses, hardware processor 902 may increment the pulse counter may be incremented for the pulse characteristic.

Hardware processor 902 may execute instruction 910 to determine whether to add the detected radio frequency pulse to the deny list. For example, when the pulse characteristic does not match the at least one pulse characteristic of the pulse characteristics corresponding to the plurality of detected radio frequency pulses, hardware processor 902 may determine whether to add the detected radio frequency pulse to the deny list. This may include, for example, determining that the detected radio frequency pulse is radar or noise that has not been added to the deny list yet.

In some examples, hardware processor 902 may execute an instruction to vacate a frequency band of the environment of wireless devices where the detected radio frequency pulse was received, wherein vacating the frequency band follows a Dynamic Frequency Selection (DFS) that defines rules dictating use of the frequency band. For example, when the first pulse characteristic does not match at least one of the pulse characteristics corresponding to the plurality of detected radio frequency pulses when the detected radio frequency pulse is radar, hardware processor 902 may vacate the frequency band.

In some examples, the determination of whether to add the detected radio frequency pulse to the plurality of detected radio frequency pulses in the deny list at the communication device depends on the pulse counter associated with the detected radio frequency pulse exceeding a second pulse counter in the deny list. In these examples, hardware processor 902 may execute an instruction to remove the second radio frequency pulse and the second pulse counter from the deny list; and add the detected radio frequency pulse and the pulse counter to the deny list In some examples, the second pulse counter that is removed from the deny list is a lowest value associated with the plurality of detected radio frequency pulses in the deny list.

In some examples, hardware processor 902 may execute an instruction to apply a decay value to a second pulse counter of a second radio frequency pulse in the deny list at the communication device; and when the second pulse counter is less than or equal to a threshold pulse counter, remove the second radio frequency pulse from the deny list.

In some examples, the communication device is an access point (AP) and the detected radio frequency pulse is received by detecting the detected radio frequency pulse from a client device adjacent to the AP.

In some examples, the communication device is a controller device in communication with a plurality of access points (APs) and the detected radio frequency pulse is received from the plurality of APs.

In some examples, the determination of whether to add the detected radio frequency pulse to the plurality of detected radio frequency pulses in the deny list at the communication device depends on an availability of a storage cell in the deny list, and the availability of the storage cell is based on a technical limitation of finite storage cells in the deny list.

Figure 10:
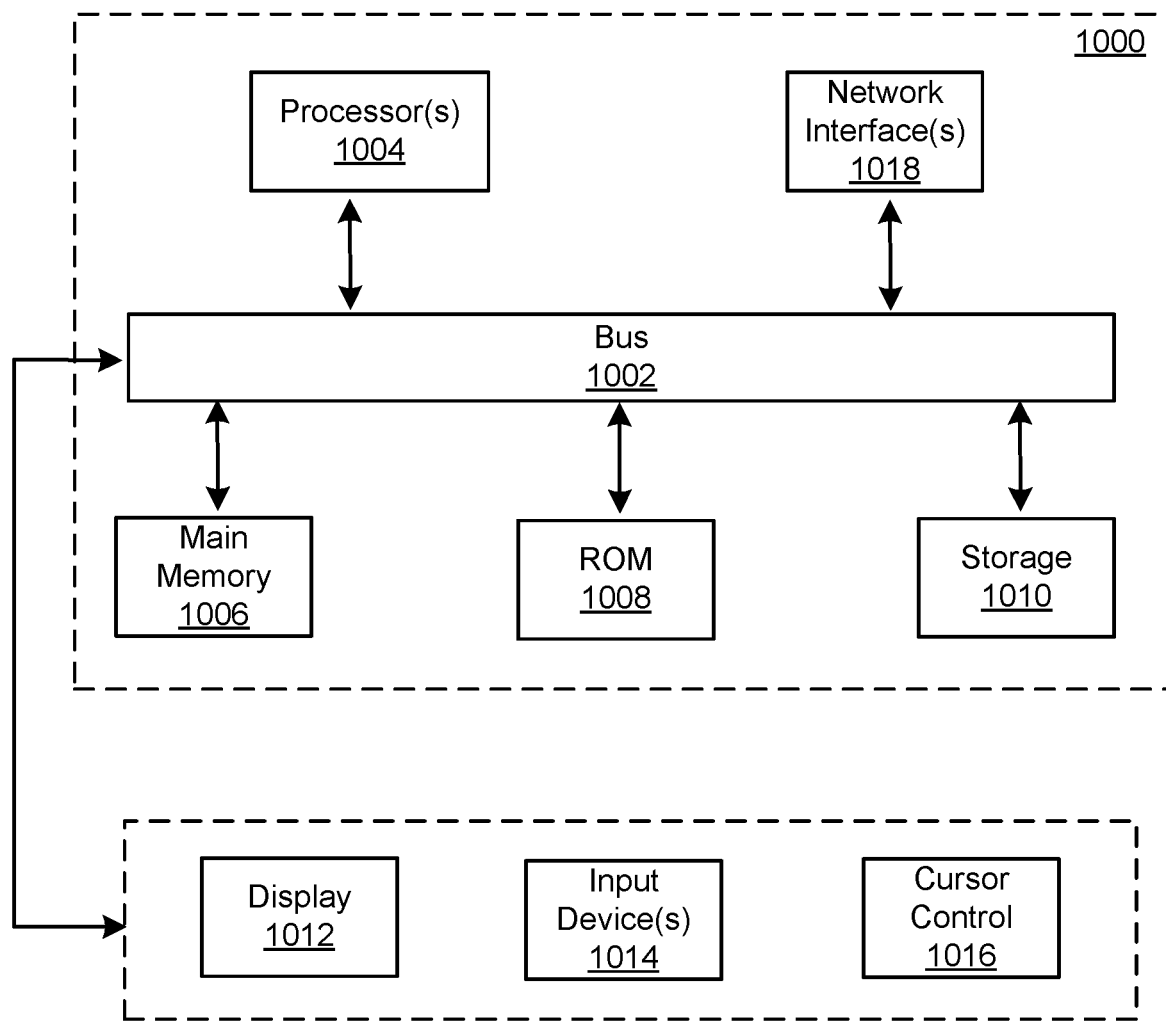
FIG. 10 is an example computing component that may be used to implement various features of embodiments described in the present disclosure.

FIG. 10 depicts a block diagram of an example computer system 1000 in which various of the embodiments described herein may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a liquid crystal display (LCD) (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. In some embodiments, the same direction information and command selections as cursor control may be implemented via receiving touches on a touch screen without a cursor.

The computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

The computer system 1000 also includes a communication interface 1018 coupled to bus 1002. Communication interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network(s), network link and communication interface 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1000.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A communication device for detecting radar in an environment of wireless devices, the communication device comprising:
  a memory; and
  one or more processors that are configured to execute machine readable instructions stored in the memory that cause the one or more processors to:
    detect a radio frequency pulse, the detected radio frequency pulse reflecting a pulse characteristic;
    compare the pulse characteristic with pulse characteristics corresponding to a plurality of detected radio frequency pulses that are stored in a deny list at the communication device;
    when the pulse characteristic matches at least one of the pulse characteristics of the pulse characteristics corresponding to the plurality of detected radio frequency pulses, increment a pulse counter associated with the at least one pulse characteristic of the pulse characteristics and ignore the detected radio frequency pulse, the pulse counter being incremented each time the at least one pulse characteristic for the plurality of detected radio frequency pulses is detected within the environment of wireless devices;
    when the pulse characteristic does not match the at least one pulse characteristic of the pulse characteristics corresponding to the plurality of detected radio frequency pulses, determine whether to add the pulse characteristic corresponding with the detected radio frequency pulse to the deny list at the communication device;
    apply a decay value to a stored pulse counter associated with a stored pulse characteristic in the deny list at the communication device; and
    when the stored pulse counter is less than or equal to a threshold pulse counter, remove the stored pulse characteristic from the deny list.

2. The communication device of claim 1, wherein the pulse characteristic does not match at least one of the pulse characteristic of the pulse characteristics corresponding to the plurality of detected radio frequency pulses when the detected radio frequency pulse is radar, and the one or more processors are further configured to:
  vacate a frequency band of the environment of wireless devices where the detected radio frequency pulse was received, wherein vacating the frequency band follows a Dynamic Frequency Selection (DFS) that defines rules dictating use of the frequency band.

3. The communication device of claim 1, wherein the determination of whether to add the pulse characteristic corresponding with the detected radio frequency pulse to the plurality of detected radio frequency pulses in the deny list at the communication device depends on the pulse counter associated with the at least one pulse characteristic of the pulse characteristics exceeding a stored pulse counter in the deny list, and the one or more processors are further configured to:
  remove the stored pulse counter and corresponding stored pulse characteristic from the deny list when additional storage space for increasing a size of the deny list is unavailable; and
  add the pulse characteristic corresponding with the detected radio frequency pulse and the pulse counter to the deny list.

4. The communication device of claim 3, wherein the stored pulse counter is a lowest value associated with the pulse characteristics in the deny list.

5. The communication device of claim 1, wherein the deny list comprises the pulse characteristics detected by the communication device and ignored without further analyzing the radio frequency pulse as a potential radar.

6. The communication device of claim 1, wherein the communication device is an access point (AP) and the detected radio frequency pulse is received by detecting the detected radio frequency pulse from a client device adjacent to the AP.

7. The communication device of claim 1, wherein the communication device is a controller device in communication with a plurality of access points (APs) and the detected radio frequency pulse is received from the plurality of APs.

8. The communication device of claim 1, wherein the determination of whether to add the pulse characteristic associated with the detected radio frequency pulse to the deny list at the communication device depends on an availability of a storage cell in the deny list, and wherein the availability of the storage cell is based on a technical limitation of finite storage cells in the deny list.

9. A computer-implemented method for detecting radar in an environment of wireless devices, the method comprising:
- detecting, by a communication device, a radio frequency pulse, the detected radio frequency pulse reflecting a pulse characteristic;
- comparing, by the communication device, the pulse characteristic with pulse characteristics corresponding to a plurality of detected radio frequency pulses that are stored in a deny list at the communication device;
- when the pulse characteristic matches at least one of the pulse characteristics of the pulse characteristics corresponding to the plurality of detected radio frequency pulses, incrementing, by the communication device, a pulse counter associated with the at least one pulse characteristic of the pulse characteristics and ignore the detected radio frequency pulse, the pulse counter being incremented each time the at least one pulse characteristic for the plurality of detected radio frequency pulses is detected within the environment of wireless devices; and
- when the pulse characteristic does not match the at least one pulse characteristic of the pulse characteristics corresponding to the plurality of detected radio frequency pulses, determining, by the communication device, whether to add the pulse characteristic corresponding with the detected radio frequency pulse to the deny list at the communication device;
- applying a decay value to a stored pulse counter associated with a stored pulse characteristic in the deny list at the communication device; and
- when the stored pulse counter is less than or equal to a threshold pulse counter, removing the stored pulse characteristic from the deny list.

10. The computer-implemented method of claim 9, wherein the pulse characteristic does not match at least one of the pulse characteristic of the pulse characteristics corresponding to the plurality of detected radio frequency pulses when the detected radio frequency pulse is radar, and the method further comprising:
- vacating, by the communication device, a frequency band of the environment of wireless devices where the detected radio frequency pulse was received, wherein vacating the frequency band follows a Dynamic Frequency Selection (DFS) that defines rules dictating use of the frequency band.

11. The computer-implemented method of claim 9, wherein the determination of whether to add the pulse characteristic corresponding with the detected radio frequency pulse to the plurality of detected radio frequency pulses in the deny list at the communication device depends on the pulse counter associated with the at least one pulse characteristic of the pulse characteristics exceeding a stored pulse counter in the deny list, and the method further comprising:
- removing, by the communication device, the stored pulse counter and corresponding stored pulse characteristic from the deny list when additional storage space for increasing a size of the deny list is unavailable; and
- adding, by the communication device, the pulse characteristic corresponding with the detected radio frequency pulse and the pulse counter to the deny list.

12. The computer-implemented method of claim 11, wherein the stored pulse counter is a lowest value associated with the pulse characteristics in the deny list.

13. The computer-implemented method of claim 9, wherein the communication device is an access point (AP) and the detected radio frequency pulse is received by detecting the detected radio frequency pulse from a client device adjacent to the AP.

14. The computer-implemented method of claim 9, wherein the communication device is a controller device in communication with a plurality of access points (APs) and the detected radio frequency pulse is received from the plurality of APs.

15. The computer-implemented method of claim 9, wherein the determination of whether to add the pulse characteristic associated with the detected radio frequency pulse to the deny list at the communication device depends on an availability of a storage cell in the deny list, and wherein the availability of the storage cell is based on a technical limitation of finite storage cells in the deny list.

16. A non-transitory computer-readable storage medium storing a plurality of instructions executable by one or more processors, the plurality of instructions when executed by the one or more processors cause the one or more processors to:
- detect a radio frequency pulse, the detected radio frequency pulse reflecting a pulse characteristic;
- compare the pulse characteristic with pulse characteristics corresponding to a plurality of detected radio frequency pulses that are stored in a deny list at the one or more processors;
- when the pulse characteristic matches at least one of the pulse characteristics of the pulse characteristics corresponding to the plurality of detected radio frequency pulses, increment a pulse counter associated with the at least one pulse characteristic of the pulse characteristics and ignore the detected radio frequency pulse, the pulse counter being incremented each time the at least one pulse characteristic for the plurality of detected radio frequency pulses is detected within an environment of wireless devices;
- when the pulse characteristic does not match the at least one pulse characteristic of the pulse characteristics corresponding to the plurality of detected radio frequency pulses, determine whether to add the pulse characteristic corresponding with the detected radio frequency pulse to the deny list at the one or more processors;
- apply a decay value to a stored pulse counter associated with a stored pulse characteristic in the deny list; and
- when the stored pulse counter is less than or equal to a threshold pulse counter, remove the stored pulse characteristic from the deny list.

17. The non-transitory computer-readable storage medium of claim 16, wherein the pulse characteristic does not match at least one of the pulse characteristic of the pulse characteristics corresponding to the plurality of detected radio frequency pulses when the detected radio frequency pulse is radar, and the one or more processors further to:
- vacate a frequency band of the environment of wireless devices where the detected radio frequency pulse was received, wherein vacating the frequency band follows a Dynamic Frequency Selection (DFS) that defines rules dictating use of the frequency band.

18. The non-transitory computer-readable storage medium of claim 16, wherein the determination of whether to add the pulse characteristic corresponding with the detected radio frequency pulse to the plurality of detected radio frequency pulses in the deny list at the one or more processors depends on the pulse counter associated with the at least one pulse characteristic of the pulse characteristics exceeding a stored pulse counter in the deny list, and the one or more processors further to:
  remove the stored pulse counter and corresponding stored pulse characteristic from the deny list when additional storage space for increasing a size of the deny list is unavailable; and
  add the pulse characteristic corresponding with the detected radio frequency pulse and the pulse counter to the deny list.

19. The non-transitory computer-readable storage medium of claim 18, wherein the stored pulse counter is a lowest value associated with the pulse characteristics in the deny list.

20. A communication device for detecting radar in an environment of wireless devices, the communication device comprising:
  a memory; and
  one or more processors that are configured to execute machine readable instructions stored in the memory that cause the one or more processors to:
    detect a radio frequency pulse, the detected radio frequency pulse reflecting a pulse characteristic;
    compare the pulse characteristic with pulse characteristics corresponding to a plurality of detected radio frequency pulses that are stored in a deny list at the communication device;
    when the pulse characteristic matches at least one of the pulse characteristics of the pulse characteristics corresponding to the plurality of detected radio frequency pulses, increment a pulse counter associated with the at least one pulse characteristic of the pulse characteristics and ignore the detected radio frequency pulse, the pulse counter being incremented each time the at least one pulse characteristic for the plurality of detected radio frequency pulses is detected within the environment of wireless devices;
    when the pulse characteristic does not match the at least one pulse characteristic of the pulse characteristics corresponding to the plurality of detected radio frequency pulses, determine to add the pulse characteristic corresponding with the detected radio frequency pulse to the deny list at the communication device based on the pulse counter associated with the at least one pulse characteristics exceeding a stored pulse counter in the deny list;
    remove the stored pulse counter and corresponding stored pulse characteristic from the deny list when additional storage space for increasing a size of the deny list is unavailable; and
    add the pulse characteristic corresponding with the detected radio frequency pulse and the pulse counter to the deny list.

21. A computer-implemented method for detecting radar in an environment of wireless devices, the method comprising:
  detecting, by a communication device, a radio frequency pulse, the detected radio frequency pulse reflecting a pulse characteristic;
  comparing, by the communication device, the pulse characteristic with pulse characteristics corresponding to a plurality of detected radio frequency pulses that are stored in a deny list at the communication device;
  when the pulse characteristic matches at least one of the pulse characteristics of the pulse characteristics corresponding to the plurality of detected radio frequency pulses, incrementing, by the communication device, a pulse counter associated with the at least one pulse characteristic of the pulse characteristics and ignore the detected radio frequency pulse, the pulse counter being incremented each time the at least one pulse characteristic for the plurality of detected radio frequency pulses is detected within the environment of wireless devices;
  when the pulse characteristic does not match the at least one pulse characteristic of the pulse characteristics corresponding to the plurality of detected radio frequency pulses, determining, by the communication device, to add the pulse characteristic corresponding with the detected radio frequency pulse to the deny list at the communication device based on the pulse counter associated with the at least one pulse characteristic of the pulse characteristics exceeding a stored pulse counter in the deny list;
  removing the stored pulse counter and corresponding stored pulse characteristic from the deny list when additional storage space for increasing a size of the deny list is unavailable; and
  adding the pulse characteristic corresponding with the detected radio frequency pulse and the pulse counter to the deny list.

22. A non-transitory computer-readable storage medium storing a plurality of instructions executable by one or more processors, the plurality of instructions when executed by the one or more processors cause the one or more processors to:
  detect a radio frequency pulse, the detected radio frequency pulse reflecting a pulse characteristic;
  compare the pulse characteristic with pulse characteristics corresponding to a plurality of detected radio frequency pulses that are stored in a deny list at the one or more processors;
  when the pulse characteristic matches at least one of the pulse characteristics of the pulse characteristics corresponding to the plurality of detected radio frequency pulses, increment a pulse counter associated with the at least one pulse characteristic of the pulse characteristics and ignore the detected radio frequency pulse, the pulse counter being incremented each time the at least one pulse characteristic for the plurality of detected radio frequency pulses is detected within an environment of wireless devices;
  when the pulse characteristic does not match the at least one pulse characteristic of the pulse characteristics corresponding to the plurality of detected radio frequency pulses, determine to add the pulse characteristic corresponding with the detected radio frequency pulse to the deny list at the one or more processors based on the pulse counter associated with the at least one pulse characteristic of the pulse characteristics exceeding a stored pulse counter in the deny list;
  remove the stored pulse counter and corresponding stored pulse characteristic from the deny list when additional storage space for increasing a size of the deny list is unavailable; and
  add the pulse characteristic corresponding with the detected radio frequency pulse and the pulse counter to the deny list.

* * * * *